W. A. BERNARD.
PLIERS, NIPPERS, OR SIMILAR TOOL.
APPLICATION FILED MAY 15, 1912.
1,057,113.
Patented Mar. 25, 1913.
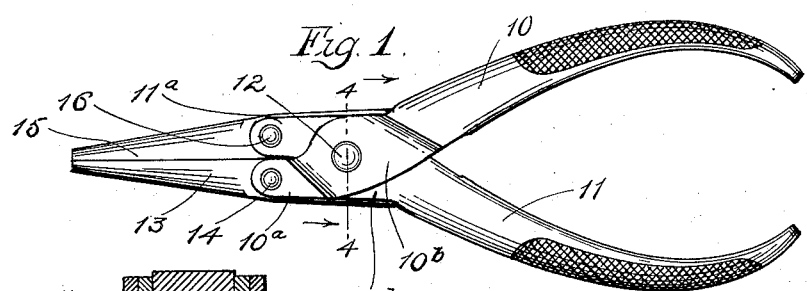
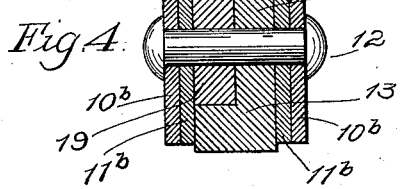
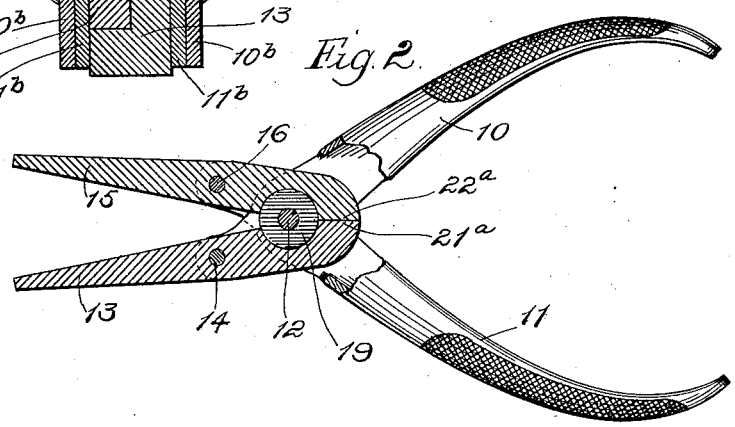
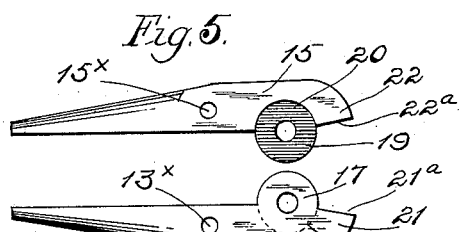
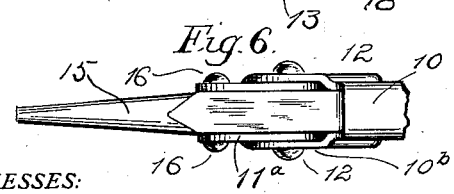
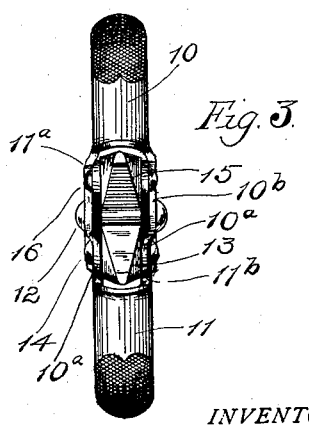
WITNESSES:
J. S. Coleman
Mary E. Fuller
INVENTOR:
William A. Bernard,
BY
Beach & Fisher
ATTORNEYS.

UNITED STATES PATENT OFFICE.

WILLIAM A. BERNARD, OF NEW HAVEN, CONNECTICUT, ASSIGNOR TO THE WILLIAM SCHOLLHORN COMPANY, OF NEW HAVEN, CONNECTICUT, A CORPORATION OF CONNECTICUT.

PLIERS, NIPPERS, OR SIMILAR TOOL.

1,057,113.  Specification of Letters Patent.  Patented Mar. 25, 1913.

Application filed May 15, 1912.  Serial No. 697,489.

*To all whom it may concern:*

Be it known that I, WILLIAM A. BERNARD, of the city and county of New Haven and State of Connecticut, have invented certain new and useful Improvements in Pliers, Nippers, or Similar Tools, of which the following is a full, clear, and exact description.

This invention relates to pliers, nippers or similar tools, having jaws movable toward and away from each other by means of pivoted handles, and the invention refers particularly to the form of the jaws and the relation of the same to the handles and to the other parts of the tool.

The primary object of the invention, is to provide a construction in which separate jaw members may be readily applied to and mounted in the respective handles in such a manner as to provide a tool of maximum simplicity and strength.

It is also aimed to provide a tool in which each jaw acts as to stop for the other jaw at both limits of its movement, and to provide other features which decrease the cost of the tool and at the same time increase its general efficiency.

To these ends, the invention consists in the novel features and combinations of parts to be hereinafter described and claimed.

In the accompanying drawing, Figure 1 is a side elevation of a pair of pliers embodying the invention, showing the tool in its closed position, Fig. 2 is a side elevation of the tool in its open position, the jaws being shown in vertical longitudinal section and the handles being partially broken away, Fig. 3 is a front elevation of the device, as shown in Fig. 2, Fig. 4 is an enlarged transverse section on line 4—4 of Fig. 1, looking in the direction of the arrows, Fig. 5 is a detail of the jaws, detached, and Fig. 6 is a top plan view of a portion of Fig. 1.

In the particular embodiment shown in the drawing, the invention is shown as applied to pliers, but it is to be understood that the shape given the gripping or working ends of the jaws, to adapt them to act as pliers, nippers, cutters or the like, is not material to the present invention, which concerns itself primarily with the arrangement of the butt ends of the jaws with respect to the handle members.

In the drawing, 10 denotes a lever handle, preferably formed of a sheet metal blank and having a closed cross-section, as shown generally in my Patent #848,877, dated April 2, 1907. The other handle 11 is similarly formed and is extended across the handle 10 to which it is pivoted by means of a pivot pin 12, of well known form. The pivot pin is located intermediate of the ends of the crossed handle members, which are each provided in advance of the pivot with forwardly extending parallel portions $10^a$, $11^a$, respectively. Between the parallel portions or plates $10^a$, a jaw 13 is secured by means of a fastening pin 14, and a similar jaw 15 is secured between the plates $11^a$ by means of a pin 16. The pins 14 and 16 respectively are both located in advance of the main pivot pin 12, and are preferably arranged at the forward extremities of the respective handle members, beyond which extremities the jaws 13 and 15 extend forwardly, as shown.

In order to pivot the handle members together, their forward ends are forked from the forward extremities of said members to a point at the rear of the pivot 12. The forked portion $10^b$ of the handle 10 is wider than the corresponding portion $11^b$ of the handle 11, in order to straddle said last named portion which, in turn, straddles the rear portions of the jaws 13, 15. Although the forked portion $10^b$ extends around the forked portion $11^b$ the forward extremities $10^a$ of the first named forked portion are bent inward against the sides of the jaw 13, so as to be substantially in line with the corresponding extremities $11^a$ of the forked portion $11^b$, as best shown in Fig. 3.

The butt ends of the jaws 13, 15, extend rearwardly beyond the pivot 12 to a considerable extent, as shown in Figs. 2 and 6. At the pivotal portion of the jaw 13, the latter is provided with an upwardly extending perforated lug 17 of less width than the body portion of the jaw, and the body portion is recessed beneath said lug, as shown at 18, in order to accommodate a perforated lug 19 on the jaw 15, corresponding in shape to the lug 17. The lug 17 is similarly received in a cut-away portion 20 of the jaw 15, and the pivot pin 12 is passed through the registering perforated lugs, as shown in Fig. 4, thereby pivoting the jaws to each other in a strong and substantial manner, with each jaw overlapping the other around the pivot pin.

The rear extremities or heels of the jaws are preferably so formed as to limit the opening of the jaws at a predetermined point. In the embodiment shown, the heel 21 of the jaw 13 is cut away to present a stop surface 21$^a$ located out of alinement with the longitudinal axis of the tool when the jaws are closed, and the heel 22 of the jaw 15 is provided with a similar stop surface 22$^a$. In the normal closed position of the tool the stop surfaces 21$^a$, 22$^a$ diverge rearwardly, as will be understood from the inspection of Fig. 5. When the jaws have been swung open to a certain extent about the pivot 12, the stop surfaces 21$^a$, 22$^a$, will contact with each other in the manner shown in Fig. 2 and thereby prevent a further opening movement.

As the closing movement of the jaws is limited by the contact of the working portions with each other, and as the opening movement is limited by the stop portions on the jaws at the rear of the pivot, it will be understood that the jaws are provided with interacting means to limit both their closing and opening movements.

It will be observed that the openings 13$^x$, 15$^x$, formed in the respective jaws (Fig. 5) for the attachment thereof to the respective handle members by means of the pins 14, 16 are well forward of the pivotal portions of the jaws. Each jaw is secured to its handle member at a point in advance of the handle pivot, and at another point coincident with said pivot. By this construction, the mounting of the jaws in the respective handles is considerably facilitated, and moreover, a considerable advantage arises from the fact that the operating force transmitted to the gripping portions of the handles is in turn transmitted to the jaws at points which are quite close to the working or gripping portions of the jaws. With the fastening pins 14, 16 or their equivalents located at or adjacent the forward extremities of the forked portions of the handles, the attachment of the jaws to the handles in the course of manufacture is made a comparatively simple matter, it being understood that the only other connection necessary, is that produced by placing the main pivot pin through the overlapping portions of the jaws. These features of the improved tool therefore simplify the construction very materially and facilitate the manufacture of the tool, providing a device of maximum simplicity, strength and durability.

Of course, it is to be understood that while the foregoing description is a detailed one in so far as it concerns the particular embodiment of my invention selected for illustration, various changes may be made in the construction without departing from the scope of the invention as defined in the claims.

What I claim is:

1. In a tool such as described, the combination of handle members pivoted together intermediate of their ends, and jaws pivoted together on an axis coincident with the pivot of the handle members and fixed to said handle members in advance of said pivot; substantially as described.

2. In a tool such as described, the combination of handle members having forked portions, one of which straddles the other, a pivot member passing through said forked portions and pivoting the handle members together, and jaws attached to the respective handle members forward of said pivot and mounted to turn on the axis of the latter; substantially as described.

3. In a tool such as described, the combination of handle members straddling each other, a pivot connecting said members, separate jaws straddled by the respective handle members and attached to the same by said pivot, and means to attach the respective jaws to the respective handle members in advance of the pivot; substantially as described.

4. In a tool such as described, the combination of handle members pivoted together intermediate of their ends, and separate jaws mounted to swing on the pivot of said handle members and fixed to the forward extremities of the respective handle members; substantially as described.

5. In a tool such as described, jaws pivoted together intermediate of their ends and having working portions in advance of the pivot and interacting stop portions at the rear of the pivot which limit the opening movement of the jaws; substantially as described.

6. In a tool such as described, the combination of pivoted handle members, and separate pivoted jaws carried thereby and having working portions in advance of their pivot and interengaging stop portions at the rear of said pivot which limit the opening movement of the jaws; substantially as described.

7. In a tool such as described, the combination of pivoted handle members, and separate pivoted jaws carried thereby and having interengaging means to limit both their closing and opening movements; substantially as described.

8. In a tool such as described, jaws pivoted together intermediate of their ends and having working portions in advance of the pivot, and stop portions which diverge from each other at the rear of the pivot when the jaws are closed, and move into contact with each other as the jaws are opened to a predetermined extent; substantially as described.

9. In a tool such as described, the combination of pivoted handle members, and separate jaws pivoted together intermediate of their ends on the axis of the handle member pivot and provided with stop surfaces at the rear of said pivot, which extend in contact with each other approximately in line with the longitudinal axis of the tool when the jaws are opened to a predetermined extent; substantially as described.

10. In a tool such as described, the combination of handle members pivoted together intermediate of their ends, and jaws carried by the respective members, at least one of said jaws being constituted by a separate member mounted to swing on the pivot of said handle members and fixed to one of said handle members in advance of said pivot; substantially as described.

11. In a tool such as described, the combination of handle members, means pivoting them together intermediate of their ends, jaws extending forward of the pivotal connection between the handles and mounted to swing on the axis of such pivotal connection, and means fixing the handle members to the jaws forward of said pivotal connection; substantially as described.

12. In a tool such as described, the combination of handle members, means pivoting them together intermediate of their ends, jaws extending forward of the pivotal connection between the handles and mounted to swing on the axis of such pivotal connection, and means fixing the handle members to the jaws forward of said pivotal connection and forward of the rear extremities of said jaws; substantially as described.

13. In pliers, nippers, or similar tools, the combination of handle members, means pivotally connecting said handle members at a point in the rear of the forward extremities of the same, and jaws fixed to the forward extremities of said handle members and pivoted together and extending rearwardly beyond the pivotal connection of said members; substantially as described.

14. In pliers, nippers, or similar tools, the combination of handle members, means pivotally connecting said members at a point in the rear of the forward extremities of said members, jaws fixed to the forward extremities of said members and extending rearwardly beyond the pivotal connection between the latter, and interacting stop means carried by the rear extremities of the jaws; substantially as described.

15. In pliers, nippers, or similar tools, the combination of handle members, a pin pivoting said members together at a point in the rear of the forward extremities of said members, and jaws secured to said members forward of the pivot pin and overlapping each other around said pivot pin, said jaws being provided in the rear of said pivot pin with portions forming stops to limit the opening movement of the jaws; substantially as described.

16. In pliers, nippers, or similar tools, the combination of handle members having forked portions straddling each other, a pin pivoting said members together in the rear of the forward extremities of said forked portions, a jaw straddled by the forked portion of one of said members in advance of said pivot pin and extending around the pivot pin, a pin securing said jaw fixedly to the forward extremity of said forked portion, a second jaw straddled by the forward forked extremity of the other member in advance of the pivot pin and extending around said pivot pin, and a pin securing said jaw fixedly to the forward extremity of said last named forked portion, the rear ends of said jaws being extended behind the pivot pin to present coöperating stop surfaces; substantially as described.

17. In a tool such as described, the combination of crossed handle members pivoted together intermediate of their ends, and jaws pivoted on an axis coincident with the pivotal connection of said members and extending behind said pivotal connection, said jaws being attached to the respective members in advance of said connection but free of said members in the rear of said connection; substantially as described.

In witness whereof, I have hereunto set my hand on the 14th day of May, 1912.

WILLIAM A. BERNARD.

Witnesses:
FREDERICK H. WIGGIN,
HENRY E. ROCKWELL.

Copies of this patent may be obtained for five cents each, by addressing the "Commissioner of Patents, Washington, D. C."